United States Patent
Wang

(10) Patent No.: US 10,791,455 B2
(45) Date of Patent: Sep. 29, 2020

(54) METHOD FOR TRIGGERING NETWORK POLICY UPDATE, MANAGEMENT FUNCTION ENTITY AND CORE NETWORK DEVICE

(71) Applicant: CHINA ACADEMY OF TELECOMMUNICATIONS TECHNOLOGY, Beijing (CN)

(72) Inventor: Hucheng Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/321,896

(22) PCT Filed: Jun. 8, 2017

(86) PCT No.: PCT/CN2017/087510
§ 371 (c)(1),
(2) Date: Jan. 30, 2019

(87) PCT Pub. No.: WO2018/024028
PCT Pub. Date: Feb. 8, 2018

(65) Prior Publication Data
US 2020/0037148 A1    Jan. 30, 2020

(30) Foreign Application Priority Data

Aug. 4, 2016    (CN) .......................... 2016 1 0634585

(51) Int. Cl.
*H04W 8/08* (2009.01)
*H04W 76/25* (2018.01)
(Continued)

(52) U.S. Cl.
CPC ............... *H04W 8/08* (2013.01); *H04W 8/20* (2013.01); *H04W 76/19* (2018.02); *H04W 76/25* (2018.02); *H04W 80/12* (2013.01)

(58) Field of Classification Search
None
See application file for complete search history.

(56) References Cited

U.S. PATENT DOCUMENTS

| | | | | |
|---|---|---|---|---|
| 2010/0002629 | A1* | 1/2010 | Moussa | H04W 48/04 370/328 |
| 2010/0180319 | A1 | 7/2010 | Hu et al. | |
| 2011/0105115 | A1* | 5/2011 | Li | H04W 12/06 455/432.1 |
| 2012/0151029 | A1 | 6/2012 | You et al. | |

(Continued)

FOREIGN PATENT DOCUMENTS

| | | |
|---|---|---|
| CN | 101345633 A | 1/2009 |
| CN | 101483847 A | 7/2009 |

(Continued)

OTHER PUBLICATIONS

Korean Office Action dated Dec. 24, 2019 for KR Application No. 10-2019-7006087.

(Continued)

*Primary Examiner* — Hassan A Phillips
*Assistant Examiner* — Gautam Sharma
(74) *Attorney, Agent, or Firm* — Harness, Dickey and Pierce, P.L.C.

(57) ABSTRACT

A method for triggering network policy update, a management function entity and a core network device are provided. The method is configured to be applied to a policy management function entity, and includes: acquiring a network policy parameter, the network policy parameter being determined and acquired in accordance with application layer information of a UE; and triggering the network policy update in accordance with the network policy parameter.

11 Claims, 7 Drawing Sheets

(51) Int. Cl.
*H04W 76/19* (2018.01)
*H04W 8/20* (2009.01)
*H04W 80/12* (2009.01)

(56) References Cited

U.S. PATENT DOCUMENTS

| | | | |
|---|---|---|---|
| 2014/0355542 A1 | 12/2014 | Zhang | |
| 2015/0189539 A1 | 7/2015 | Li et al. | |
| 2017/0339609 A1* | 11/2017 | Youn | H04W 76/11 |
| 2017/0366618 A1* | 12/2017 | Vrzic | H04W 8/18 |
| 2018/0332648 A1* | 11/2018 | Zhu | H04W 28/06 |
| 2019/0082418 A1* | 3/2019 | Zee | H04W 68/025 |
| 2019/0150219 A1* | 5/2019 | Wang | H04W 36/0033 370/329 |
| 2019/0200280 A1* | 6/2019 | Ramle | H04W 8/02 |
| 2019/0208465 A1* | 7/2019 | Mihaly | H04W 8/26 |
| 2019/0364541 A1* | 11/2019 | Ryu | H04W 72/02 |

FOREIGN PATENT DOCUMENTS

| | | | |
|---|---|---|---|
| CN | 105392149 A | | 3/2016 |
| EP | 2547049 A1 | | 1/2013 |
| WO | WO-2008136604 A1 | | 11/2008 |
| WO | WO-2014075211 A1 | | 5/2014 |

OTHER PUBLICATIONS

3GPP TR 23.799 V0.6.0, 3rd Generation Partnership Project; Technical Specification Group Services and System Aspects; Study on Architecture for Next Generation System (Release 14), 3GPP server publication date Jul. 22, 2016.
Japanese Office Action dated Nov. 5, 2019 for JP Patent Application No. 2019-504974.
Ericsson, "Update of solution on 'Mobility levels using Mobility and Session classes'", 3 GPP TSG, SA WG2 Meeting #116, S2-164001, Jul. 11-15, 2016, Vienna, Austria.
Catt, "MM WT#3 on mobility levels", 3GPP TSG, SA WG2 Meeting #16, S2-163418, Jul. 11-15, 2016, Vienna, Austria.
International Search Report PCT/ISA/210 for International Application No. PCT/CN2017/087510 dated Sep. 7, 2017.
Extended European Search Report dated Mar. 25, 2019 for EP Application No. 17836211.7.
Chinese Office Action dated Dec. 24, 2018 for CN Application No. 201610634585.1.
"Solution for determining UE mobility level", CATT, 3GPP TSG SA WG2 Meeting #115, S2-162655.

* cited by examiner acquiring a network policy parameter, the network policy parameter being determined and acquired in accordance with application layer information of a UE — 21 triggering the network policy update in accordance with the network policy parameter — 22

METHOD FOR TRIGGERING NETWORK POLICY UPDATE, MANAGEMENT FUNCTION ENTITY AND CORE NETWORK DEVICE

CROSS-REFERENCE TO RELATED APPLICATIONS

The present application is the U.S. national phase of PCT Application No. PCT/CN2017/087510 filed on Jun. 8, 2017, which claims priority to the Chinese patent application No. 2016/10634585.1 filed on Aug. 4, 2016, each of which are incorporated herein by reference in their entireties.

TECHNICAL FIELD

The present disclosure relates to the field of communication technology, in particular to a method for triggering network policy update, a management function entity and a core network device.

BACKGROUND

During the policy control for a Next-Generation (Next-Gen) network, it is necessary for the network to generate a network policy for a User Equipment (UE), so as to control a network communication procedure for the UE. The network policy includes mobility restriction for the UE or a continuity mode for a Protocol Data Unit (PDU).

The mobility restriction of the UE and the continuity mode for the PDU will be described hereinafter.

1. Mobility Restriction of the UE

For a $5^{th}$-Generation (5G) network, it is necessary to provide mobility support in a differentiated manner in accordance with the mobility of the UE. Hence, the network needs to determine the mobility restriction of the UE, e.g., immobility, restricted mobility or unrestricted mobility.

During the determination of the mobility restriction of the UE, it is probably necessary for the network to refer to information of the UE, e.g., subscription information, a position of the UE and a time period within which the UE is located. The subscription information includes the possible mobility restriction of the UE, e.g., the UE has restricted mobility when it is located at place A, and has unrestricted mobility when it is located at a position other than place A. During the determination of the mobility restriction of the UE, at first, a policy control/management function of the network acquires the possible mobility restriction of the UE in the subscription information of the UE, and then determines current mobility restriction of the UE In accordance with a current position of the UE, a current time and a feature of a currently-used application.

2. Continuity Mode for PDU Session

For the 5G network, when the UE requests to establish the PDU session, at first, it is necessary to determine the continuity mode for the to-be-established PDU session. Principally, the continuity mode for the to-be-established PDU session is determined by the UE in accordance with indication information from installed application software. Then, the UE provides the session continuity mode for the established PDU session to the network.

When the UE does not indicate the session continuity mode for the to-be-established PDU session to the network, it is necessary for the network to select the continuity mode for the PDU session for the UE.

As shown in FIG. 1, in a Long Term Evolution (LTE) network, application layer information, including Quality of Service (QoS) requirement of the application, an identifier of the application, and the like may be transmitted via an Rx interface between an Application Function (AF) and a Policy and Charging Rules Function (PCRF). The application layer information transmitted via the Rx interface may be stored in the PCRF. However, in the related art, the PCRF does not acquire mobility information of the UE and continuity requirement on the PDU session from an application server via the Rx interface.

It should be appreciated that, the mobility information of the UE may probably be acquired by the application server in a more accurate manner, e.g., the application server may acquire a movement rule or a future movement trajectory of the UE. The mobility information of the UE may be adopted by the network so as to determine the mobility restriction of the UE in a more accurate manner. However, for a conventional method for determining the mobility restriction of the UE, the acquisition of the mobility information of the UE from an application layer has not been taken into consideration yet.

In the related art, the continuity requirement on the PDU session established by the UE is determined based on the indication information from the software, without taking the differentiated service requirements of the users into consideration. Actually, the application server may provide different service continuity requirements for different users, e.g., it may provide high continuity for a high-value customer. Hence, in the related art, it is impossible to provide the service continuity in accordance with the requirements on the application.

In a word, it is impossible to dynamically trigger the network policy update in accordance with the application layer information in the related art.

SUMMARY

An object of the present disclosure is to provide a method for triggering network policy update, a management function entity and a core network device, so as to solve the problem in the related art where the network communication is adversely affected when an inappropriate network policy is generated and it is impossible to dynamically trigger the network policy update in accordance with the application layer information.

In one aspect, the present disclosure provides in some embodiments a method for triggering network policy update. The method is configured to be applied to a policy management function entity, and includes: acquiring a network policy parameter, the network policy parameter being determined and acquired in accordance with application layer information of a UE; and triggering the network policy update in accordance with the network policy parameter.

In a possible embodiment of the present disclosure, the acquiring the network policy parameter includes: receiving the application layer information of the UE transmitted from an application server; and determining the network policy parameter corresponding to the application layer information in accordance with the application layer information.

In a possible embodiment of the present disclosure, when the application layer information includes mobility information of the UE, the determining the network policy parameter corresponding to the application layer information in accordance with the application layer information includes: determining mobility restriction of the UE in accordance with the mobility information of the UE.

In a possible embodiment of the present disclosure, when the application layer information includes continuity feature information of a service, the determining the network policy parameter corresponding to the application layer information in accordance with the application layer information includes: determining a continuity mode required by a PDU session in accordance with the continuity feature information of the service.

In a possible embodiment of the present disclosure, prior to receiving the application layer information transmitted from the application server, the method further includes: transmitting subscription information to the application server, the subscription information indicating acquisition of designated application layer information from the application server.

In a possible embodiment of the present disclosure, the acquiring the network policy parameter includes: acquiring the network policy parameter transmitted from a core network device, the network policy parameter being determined and acquired by the core network device in accordance with the application layer information of the UE.

In a possible embodiment of the present disclosure, the triggering the network policy update includes: transmitting a network policy update request to a network control function entity.

In a possible embodiment of the present disclosure, the triggering the network policy update in accordance with the network policy parameter includes: acquiring a network policy in accordance with the network policy parameter, and triggering the network policy update in accordance with the network policy; or acquiring the network policy in accordance with the network policy parameter, storing the network policy, and triggering the network policy update.

In another aspect, the present disclosure provides in some embodiments a policy management function entity, including: a first acquisition module configured to acquire a network policy parameter, the network policy parameter being determined and acquired in accordance with application layer information of a UE; and a first triggering module configured to trigger the network policy update in accordance with the network policy parameter.

In a possible embodiment of the present disclosure, the first acquisition module includes: a first reception unit configured to receive the application layer information of the UE transmitted from an application server; and a determination unit configured to determine the network policy parameter corresponding to the application layer information in accordance with the application layer information.

In a possible embodiment of the present disclosure, when the application layer information includes mobility information of the UE, the determination unit is further configured to: determine mobility restriction of the UE in accordance with the mobility information of the UE.

In a possible embodiment of the present disclosure, when the application layer information includes continuity feature information of a service, the determination unit is further configured to determine a continuity mode required by a PDU session in accordance with the continuity feature information of the service.

In a possible embodiment of the present disclosure, the policy management function entity further includes: a subscription information transmission module configured to transmit subscription information to the application server, the subscription information indicating acquisition of designated application layer information from the application server.

In a possible embodiment of the present disclosure, the first acquisition module includes: an acquisition unit configured to acquire the network policy parameter transmitted from a core network device, wherein the network policy parameter is determined and acquired by the core network device in accordance with the application layer information of the UE.

In a possible embodiment of the present disclosure, the first triggering module is further configured to transmit a network policy update request to a network control function entity.

In a possible embodiment of the present disclosure, the first triggering module is further configured to: acquire a network policy in accordance with the network policy parameter, and trigger the network policy update in accordance with the network policy; or acquire the network policy in accordance with the network policy parameter, store the network policy, and trigger the network policy update.

In yet another aspect, the present disclosure provides in some embodiments a method for triggering network policy update. The method is configured to be applied to a core network device, and includes: acquiring application layer information of a UE from an application server; acquiring a network policy parameter corresponding to the application layer information in accordance with the application layer information; and transmitting the network policy parameter to a subscription management function entity or a policy management function entity, and triggering the subscription management function entity or the policy management function entity to perform the network policy update.

In a possible embodiment of the present disclosure, the application layer information includes mobility information of the UE and/or continuity feature information of a service, the network policy parameter corresponding to the mobility information of the UE is mobility restriction of the UE, and the network policy parameter corresponding to the continuity feature information of the service is a continuity mode required by a PDU session.

In a possible embodiment of the present disclosure, the acquiring the network policy parameter corresponding to the application layer information in accordance with the application layer information includes: analyzing and extracting the application layer information, and converting the application layer information into the corresponding network policy parameter.

In still yet another aspect, the present disclosure provides in some embodiments a core network device, including: a second acquisition module configured to acquire application layer information of a UE from an application server; a third acquisition module configured to acquire a network policy parameter corresponding to the application layer information in accordance with the application layer information; and a parameter transmission module configured to transmit the network policy parameter to a subscription management function entity or a policy management function entity, and trigger the subscription management function entity or the policy management function entity to perform the network policy update.

In a possible embodiment of the present disclosure, the application layer information includes mobility information of the UE and/or continuity feature information of a service, the network policy parameter corresponding to the mobility information of the UE is mobility restriction of the UE, and the network policy parameter corresponding to the continuity feature information of the service is a continuity mode required by a PDU session.

In a possible embodiment of the present disclosure, the third acquisition module is further configured to analyze and extract the application layer information, and convert the application layer information into the corresponding network policy parameter.

In still yet another aspect, the present disclosure provides in some embodiments a method for triggering network policy update, wherein the method is configured to be applied to a subscription management function entity, and includes: receiving a network policy parameter transmitted from a core network device, the network policy parameter being determined and acquired by the core network device in accordance with application layer information of an application server; and storing the network policy parameter, and triggering the network policy update in accordance with the network policy parameter; or acquiring the network policy in accordance with the network policy parameter, storing the network policy and triggering the network policy update.

In still yet another aspect, the present disclosure provides in some embodiments a subscription function entity, including: a reception module configured to receive a network policy parameter transmitted from a core network device, the network policy parameter being determined and acquired by the core network device in accordance with application layer information of an application server; and a second triggering module configured to store the network policy parameter, and trigger the network policy update in accordance with the network policy parameter; or a third triggering module configured to acquire the network policy in accordance with the network policy parameter, store the network policy and trigger the network policy update.

In still yet another aspect, the present disclosure provides in some embodiments a policy management function entity, including a processor, a memory and a transceiver. The processor is configured to read a program stored in the memory, so as to: acquire a network policy parameter, the network policy parameter being determined and acquired in accordance with application layer information of a UE; and trigger the network policy update in accordance with the network policy parameter. The transceiver is configured to receive and transmit data. The processor takes charge of managing the bus architecture as well as general processings, and the memory is configured to store therein data for the operation of the processor.

In still yet another aspect, the present disclosure provides in some embodiments a core network device, including a processor, a memory and a transceiver. The processor is configured to read a program stored in the memory, so as to: acquire, through the transceiver, application layer information of a UE from an application server; acquire a network policy parameter corresponding to the application layer information in accordance with the application layer information; transmit through the transceiver the network policy parameter to a subscription management function entity or a policy management function entity, and trigger the network policy update for subscription management function entity or the policy management function entity. The transceiver is configured to receive and transmit data. The processor takes charge of managing the bus architecture as well as general processings, and the memory is configured to store therein data for the operation of the processor.

In still yet another aspect, the present disclosure provides in some embodiments a subscription management function entity, including a processor, a memory and a transceiver. The processor is configured to read a program stored in the memory, so as to: receive through the transceiver a network policy parameter transmitted from a core network device, the network policy parameter being determined and acquired by the core network device in accordance with application layer information of an application server; and storing the network policy parameter, and triggering the network policy update in accordance with the network policy parameter; or acquiring the network policy in accordance with the network policy parameter, storing the network policy and triggering the network policy update. The transceiver is configured to receive and transmit data. The processor takes charge of managing the bus architecture as well as general processings, and the memory is configured to store therein data for the operation of the processor.

The technical effects of the present disclosure may be as follows. According to the embodiments of the present disclosure, the network policy parameter may be acquired in accordance with the application layer information of the UE. When the network policy parameter determined in accordance with the application layer information is inconsistent with a currently-adopted network policy parameter, the network policy update may be triggered. As a result, it is able to accurately determine whether a current network policy meets a network communication requirement in accordance with the application layer information. When the current network policy does not meet the communication requirement, it is able to update the network policy in real time, thereby to ensure the accuracy of the network policy and ensure the reliability of the network communication.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a method for triggering network policy update, a management function entity and a core network device, so as to solve the problem in the related art where the network communication is adversely affected when an inappropriate network policy is generated and it is impossible to dynamically trigger the network policy update in accordance with the application layer information.

Figures 1, 2:
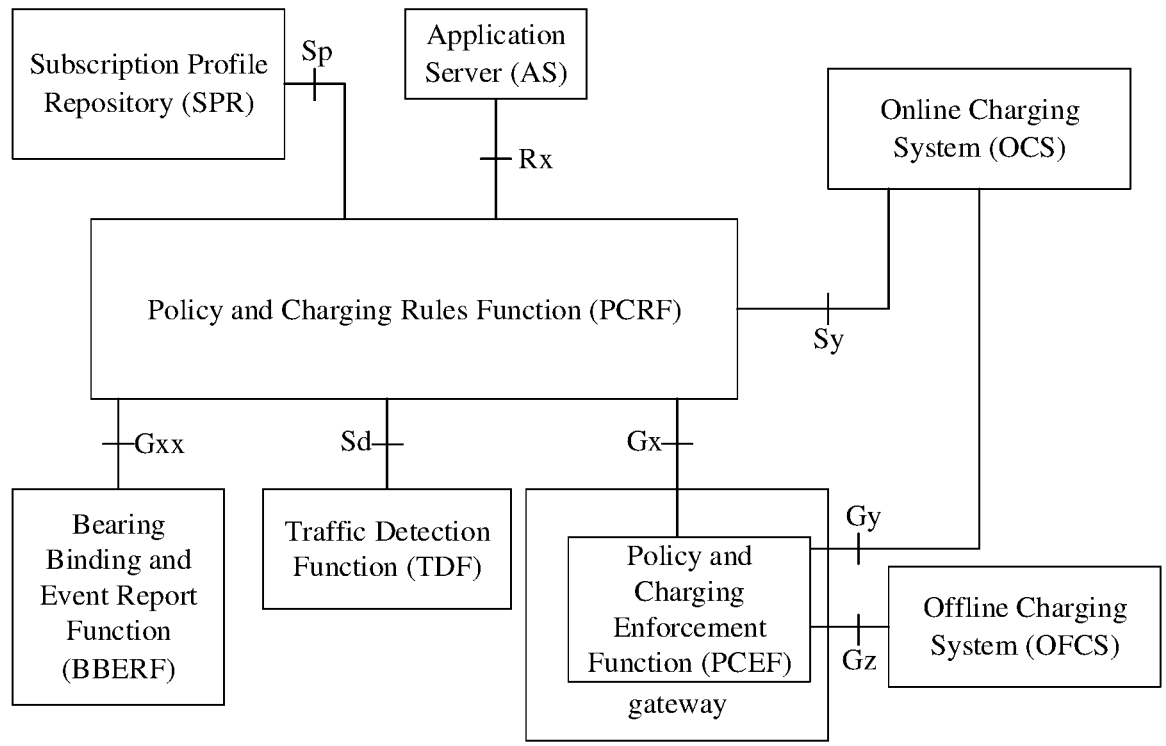
FIG. 1 is a schematic view showing a Policy and Charging Control (PCC) of a LTE network in related art.
FIG. 2 is a flow chart of a method for triggering network policy update according to some embodiments of the present disclosure.

As shown in FIG. 2, the present disclosure provides in some embodiments a method for triggering network policy update, wherein the method is configured to be applied to a policy management function entity, and includes: Step 21 of acquiring a network policy parameter, the network policy parameter being determined and acquired in accordance with application layer information of a UE; and Step 22 of triggering the network policy update in accordance with the network policy parameter.

Generally, the network policy update may be triggered only when a current network policy parameter is inconsistent with the acquired network policy parameter or a new network policy parameter has been acquired.

It should be appreciated that, the network policy parameter may be determined and acquired by the policy management function entity in accordance with the application layer information of the UE transmitted from an application server. Alternatively, the network policy parameter may be directly acquired from another core network device, wherein the network policy parameter may be determined and acquired by the other core network device in accordance with the received application layer information of the application server. It should be further appreciated that, in the embodiments of the present disclosure, the application layer information of the application server may mainly include mobility information of the UE and continuity feature information of a service. The network policy parameter corresponding to the mobility information of the UE may include mobility restriction of the UE, and the network policy parameter corresponding to the continuity feature information of the service may include a continuity mode required by a PDU session.

According to the embodiments of the present disclosure, the network policy parameter may be acquired in accordance with the application layer information of the application server. When the network policy parameter determined in accordance with the application layer information is inconsistent with a currently-adopted network policy parameter, the network policy update may be triggered. As a result, it is able to accurately determine whether a current network policy meets a network communication requirement in accordance with the application layer information. When the current network policy does not meet the communication requirement, it is able to update the network policy in real time, thereby to ensure the accuracy of the network policy and ensure the reliability of the network communication.

Figure 3:
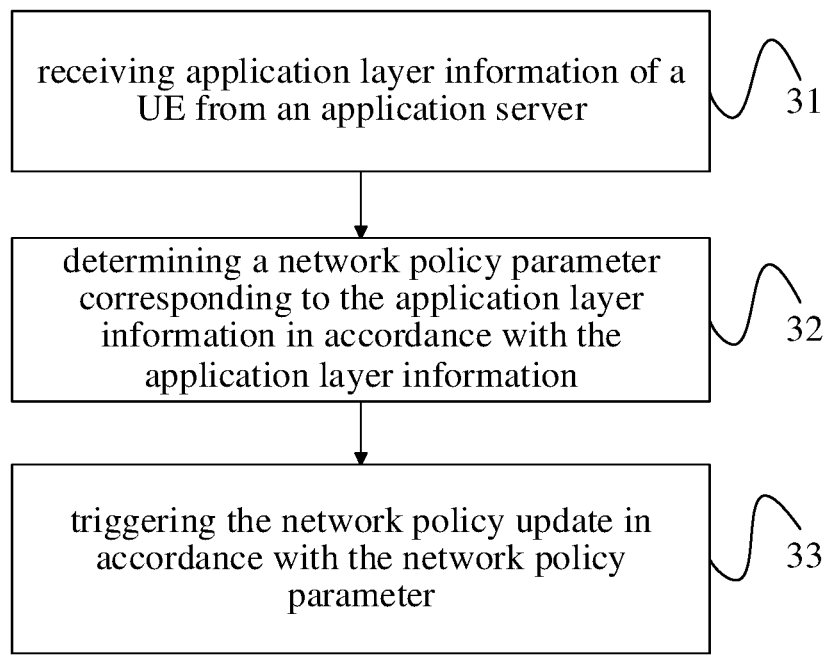
FIG. 3 is another flow chart of the method for triggering network policy update according to some embodiments of the present disclosure.

As shown in FIG. 3, the present disclosure further provides in some embodiments a method for triggering network policy update, wherein the method is configured to be applied to a policy management function entity, and includes the following steps.

Step 31: receiving application layer information of a UE from an application server.

It should be appreciated that, in the embodiments of the present disclosure, the policy management function entity may directly acquire the application layer information from the application server, and the application layer information may include mobility information of the UE and continuity feature information of a service.

Step 32: determining a network policy parameter corresponding to the application layer information in accordance with the application layer information.

Step 33: triggering the network policy update in accordance with the network policy parameter.

In the embodiments of the present disclosure, the policy management function entity may directly acquire the network policy parameter in accordance with the application layer information. When the acquired network policy parameter is inconsistent with a current network policy parameter or a new network policy parameter has been acquired, usually the policy management function entity may transmit a network policy update request to a network control function entity, and then the network control function entity may trigger the corresponding network policy update in accordance with the network policy update request transmitted from the policy management function entity.

It should be appreciated that, in some embodiments of the present disclosure, in order to enable the application server to transmit the application layer information accurately, prior to Step 31, the method may further include transmitting subscription information to the application server, the subscription information indicating the acquisition of designated application layer information from the application server.

It should be appreciated that, the policy management entity may transmit an application information subscription request to some specific application servers in accordance with a current service requirement. The application server may be a control server of a driverless car, or a map/navigation server, or the like. Usually, these application servers may transmit the mobility information of the UE to the policy management function entity in accordance with the subscription information from the policy management function entity while providing the service to the UE. For example, the control server of the driverless car may provide a movement path of the driverless car.

To be specific, when the application layer information includes the mobility information of the UE, Step 32 may include determining mobility restriction of the UE in accordance with the mobility information of the UE.

In a possible embodiment of the present disclosure, Step 33 may include: acquiring a network policy in accordance with the network policy parameter, and triggering the network policy update in accordance with the network policy; or acquiring a network policy in accordance with the network policy parameter, storing the network policy, and triggering the network policy update.

It should be appreciated that, depending on different network policy parameters, the policy management function entity may not trigger the network policy update in real time. When the policy management function entity determines that it is unnecessary to initiate a network policy update procedure immediately, it may store the network policy acquired in accordance with the network policy parameter, and when the policy management function entity determines that it is necessary to trigger the network policy update, it may trigger the network policy update procedure.

Figure 4:
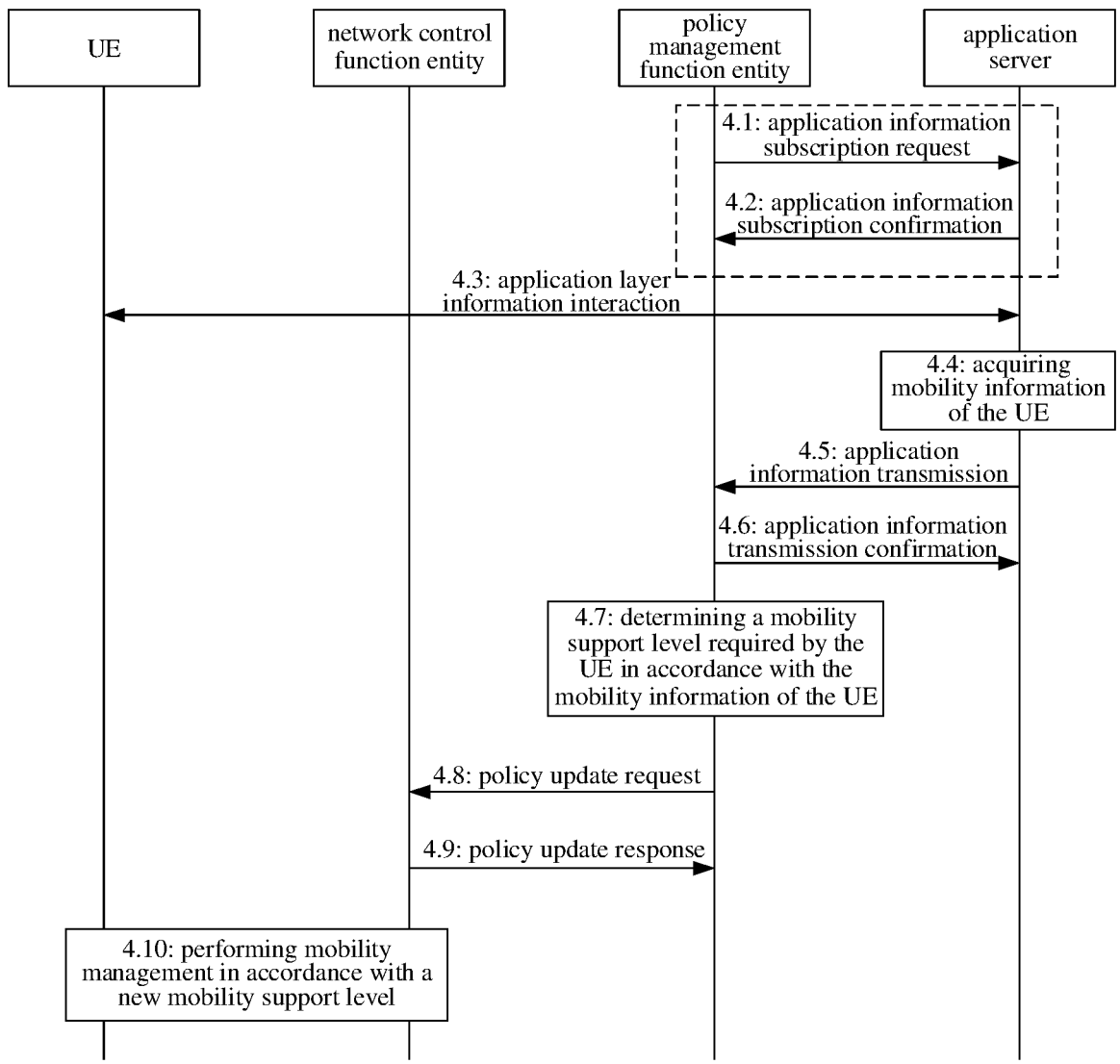
FIG. 4 is a schematic view showing a triggering procedure of the network policy update in accordance with mobility information of the UE.

As shown in FIG. 4, the triggering procedure of the network policy update in accordance with the mobility information of the UE may include the following steps.

Step 4.1: the policy management function entity may transmit an application layer information subscription request to a specific application server.

Step 4.2: upon the receipt of the application layer information subscription request, the application server may return application layer information confirmation information to the policy management function entity, and the confirmation information indicates that the policy management function entity has subscribed the application layer information of the application server successfully.

Step 4.3: the application server may perform application layer information interaction with the UE.

Step 4.4: the application server may acquire the mobility information of the UE.

Step 4.5: the application server may transmit the mobility information of the UE to the policy management function entity in accordance with the subscription information of the policy management function entity.

Step 4.6: upon the receipt of the mobility information of the UE, the policy management function entity may transmit a confirmation message to the application server.

Step 4.7: upon the receipt of the mobility information (or movement rule) of the UE provided by the application server, the policy management function entity may determine and store the mobility restriction required by the UE. For example, when a driverless car is in a running state within a time period A, in a parking state within a time period B and in an in-garage state within a time period C, the policy management server may define mobility support levels for a vehicle-mounted terminal of the driverless car as: a high mobility support level within the time period A, a low mobility support level within the time period B, and a mobility-free support level within the time period C.

Step 4.8: when the policy management function entity determines that the mobility restriction currently required by the UE is inconsistent with the current mobility restriction or the policy management function entity fails to acquire information of the mobility restriction of the UE, it may transmit a network polity update request to the network control function entity with respect to the mobility restriction of the UE. The newly-determined mobility restriction currently required by the UE may be carried in the network policy update request.

Step 4.9: upon the receipt of the network policy update request, the network control function entity may return a network policy update response to the policy management function entity.

Step 4.10: upon the receipt of the network policy update request from the network policy management entity with respect to the mobility restriction, the network control function entity may perform the corresponding mobility management on the UE.

To be specific, when the application layer information includes the continuity feature information of a service, Step 32 may include determining a continuity mode required by a PDU session in accordance with the continuity feature information of the service.

Figure 5:
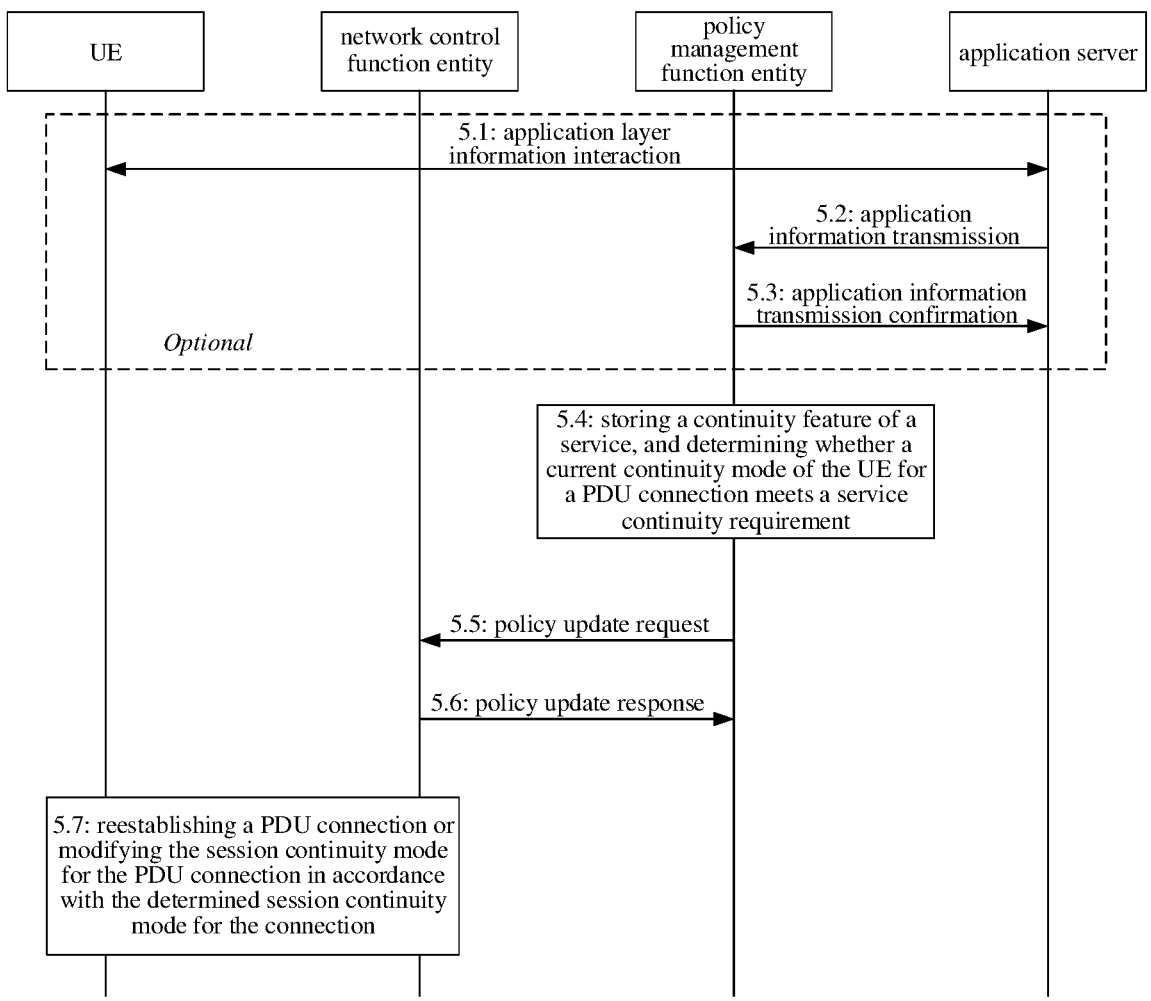
FIG. 5 is a schematic view showing a triggering procedure of the network policy update in accordance with continuity feature information of a service.

As shown in FIG. 5, the triggering procedure of the network policy update in accordance with the continuity feature information of the service may include the following steps.

Step 5.1: the application server may perform application layer information interaction with the UE, so as to acquire the continuity feature information of the service.

Step 5.2: the application server may transmit the continuity feature information of the service to the policy management function entity.

Step 5.3: upon the receipt of the continuity feature information of the service, the policy management function entity may transmit a confirmation message to the application server.

It should be appreciated that, the service continuity requirement (i.e., the continuity feature information of the service) specially configured by the application server for the UE is mainly transmitted through the above three steps. For example, a high service continuity may be provided for a high-value customer. A service continuity requirement for a common application may be stored in a network, i.e., upon the determination of the service continuity requirement, the application server may notify the policy management function entity, so as to instruct the policy management function entity to store the received service continuity requirement in the network.

Step 5.4: the policy management function entity may calculate the continuity mode required by the PDU session in accordance with the acquired service continuity requirement information.

Step 5.5: when a continuity mode for a currently-established PDU session does not match the continuity mode required by the PDU session, the policy management function entity may initiate a policy update request to the network control function entity. A newly-determined continuity mode required by the PDU session may be carried in the policy update request.

Step 5.6: upon the receipt of the network policy update request, the network control function entity may return a network polity update response to the policy management function entity.

Step 5.7: upon the receipt of the policy update request, the network control function entity may update the continuity mode required by the PDU session. To be specific, the PDU session may be acquired in the following two ways. (1) The PDU session may be updated through the new continuity mode. (2) The original PDU session may be deleted, and the network control function entity may notify the UE to re-establish the PDU session.

According to the embodiments of the present disclosure, the policy management function entity may determine the network policy parameter in accordance with the application layer information directly acquired from the application server. When the network policy parameter determined in accordance with the application layer information is inconsistent with a currently-adopted network policy parameter, the network policy update may be triggered. As a result, it is able to accurately determine whether a current network policy meets a network communication requirement in accordance with the application layer information. When the current network policy does not meet the communication requirement, it is able to update the network policy in real time, thereby to ensure the accuracy of the network policy and ensure the reliability of the network communication.

Figure 6:
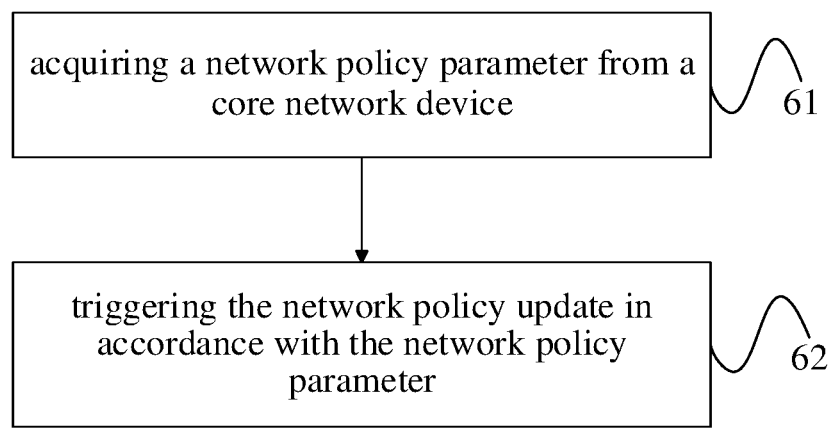
FIG. 6 is yet another flow chart of a method for triggering network policy update according to some embodiments of the present disclosure.

As shown in FIG. 6, the present disclosure further provides in some embodiments a method for triggering network policy update, wherein the method is configured to be applied to a policy management function entity, and includes the following steps.

Step 61: acquiring a network policy parameter from a core network device.

It should be appreciated that, the network policy parameter may be determined and acquired by the core network device in accordance with application layer information of a UE Step 62: triggering the network policy update in accordance with the network policy parameter.

It should be appreciated that, the implementation of Step 62 may refer to that of Step 33 in FIG. 3, and thus will not be particularly defined herein.

It should be further appreciated that, in the embodiments of the present disclosure, the policy management function entity may not directly interact with the application server, and instead, it may directly acquire the network policy parameter determined by a core network device in accordance with the application layer information of the UE. In actual use, the core network device may be a capability open platform which is directly connected to the application server to acquire the application layer information. According to the embodiments of the present disclosure, it is able to reduce a network burden of the policy management function entity, and ensure the communication stability.

Figure 7:
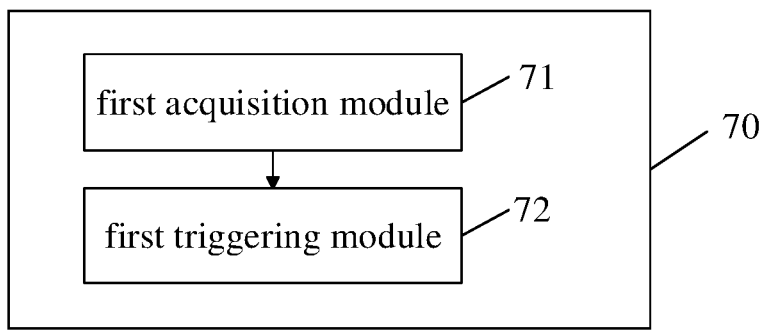
FIG. 7 is a block diagram showing a policy management function entity according to some embodiments of the present disclosure.

The present disclosure further provides in some embodiments a policy management function entity 70 which, as shown in FIG. 7, includes: a first acquisition module 71 configured to acquire a network policy parameter, the network policy parameter being determined and acquired in accordance with application layer information of a UE; and a first triggering module 72 configured to trigger the network policy update in accordance with the network policy parameter.

In a possible embodiment of the present disclosure, the first acquisition module 71 may include: a first reception unit configured to receive the application layer information of the UE from an application server; and a determination unit configured to determine the network policy parameter corresponding to the application layer information in accordance with the application layer information.

In a possible embodiment of the present disclosure, when the application layer information includes mobility information of the UE, the determination unit is further configured to determine mobility restriction of the UE in accordance with the mobility information of the UE.

In a possible embodiment of the present disclosure, when the application layer information includes continuity feature information of a service, the determination unit is further configured to determine a continuity mode for a PDU session in accordance with the continuity feature information of the service.

In a possible embodiment of the present disclosure, the policy management function entity 70 may further include a subscription information transmission module configured to transmit subscription information to the application server, the subscription information indicating the acquisition of designated application layer information from the application server.

In a possible embodiment of the present disclosure, the first acquisition module 71 may include an acquisition unit configured to acquire the network policy parameter from a core network device, the network policy parameter being determined and acquired by the core network device in accordance with the application layer information of the UE.

In a possible embodiment of the present disclosure, the first triggering module 72 is configured to transmit a network policy update request to a network control function entity.

In a possible embodiment of the present disclosure, the first triggering module 72 is further configured to: acquire a network policy in accordance with the network policy parameter, and trigger the network policy update in accordance with the network policy; or acquire a network policy in accordance with the network policy parameter, store the network policy, and trigger the network policy update.

It should be appreciated that, the implementation of the policy management function entity may refer to the implementation of the method mentioned hereinabove, with a same technical effect.

Figure 8:
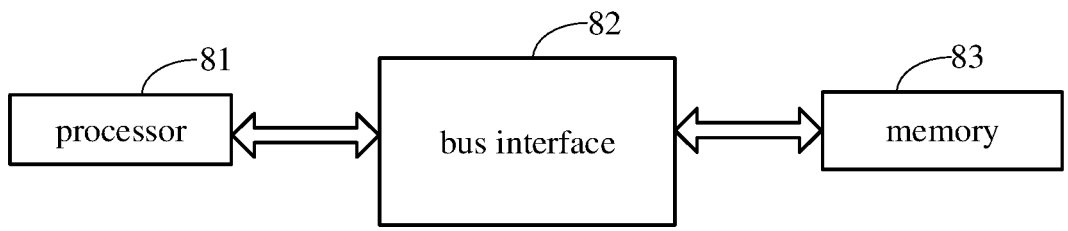
FIG. 8 is a schematic view showing the policy management function entity according to some embodiments of the present disclosure.

The present disclosure further provides in some embodiments a policy management function entity which, as shown in FIG. 8, includes a processor 81, and a memory 83 connected to the processor 81 via a bus interface 82 and configured to store therein programs and data for the operation of the processor 81. The processor 81 is configured to call and execute the programs and data stored in the memory 83, so as to: acquire a network policy parameter, the network policy parameter being determined and acquired in accordance with application layer information of an application server; and trigger network policy update in accordance with the network policy parameter.

It should be appreciated that, the processor 81 is further configured to achieve the function of any other module of the above policy management function entity.

It should be further appreciated that, in FIG. 8, bus architecture may include a number of buses and bridges connected to each other, so as to connect various circuits for one or more processors such as the processor 81 and one or more memories such as the memory 83. In addition, the bus architecture may be used to connect any other circuits, such as a circuit for a peripheral device, a circuit for a voltage stabilizer and a power management circuit. The bus interface may be provided. The processor 81 may take charge of managing the bus architecture as well as general processings. The memory 83 may store therein data for the operation of the processor 81.

It should be further appreciated that, all or parts of the steps in the embodiments of the present disclosure may be performed by hardware or a computer program instructing the corresponding hardware. The computer program may include instructions for executing parts of or all the steps in the above methods, and the computer program may be stored in a computer-readable storage medium in any form.

Figure 9:
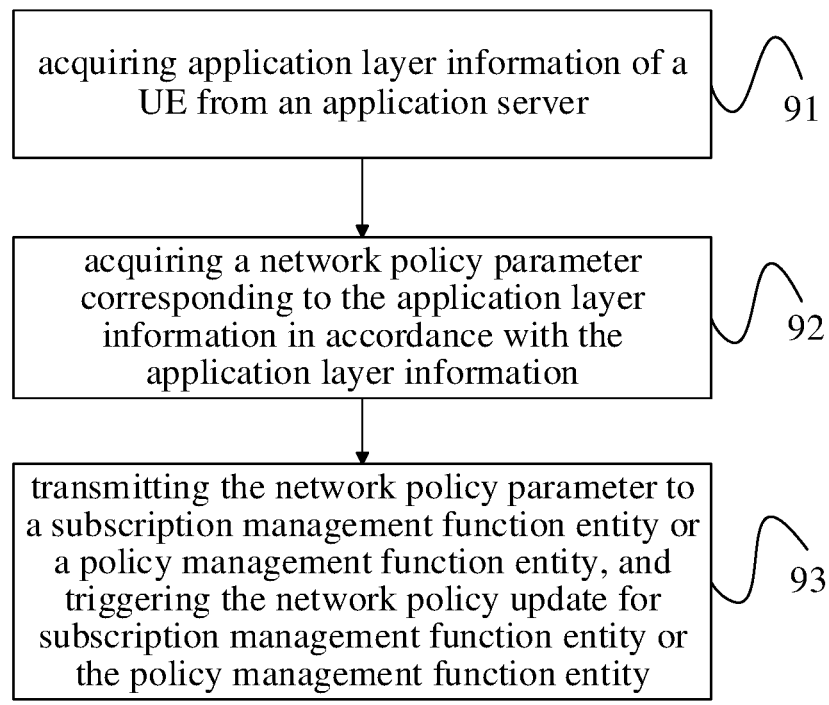
FIG. 9 is a flow chart of a method for triggering network policy update according to some embodiments of the present disclosure.

As shown in FIG. 9, the present disclosure further provides in some embodiments a method for triggering network policy update, wherein the method is configured to be applied to a core network device, and includes the following steps.

Step 91: acquiring application layer information of a UE from an application server.

Step 92: acquiring a network policy parameter corresponding to the application layer information in accordance with the application layer information.

It should be appreciated that, the application layer information may include mobility information of the UE and/or continuity feature information of a service. The network policy parameter corresponding to the mobility information of the UE may include mobility restriction of the UE, and the network polity parameter corresponding to the continuity feature information of the service may include a continuity mode required by a PDU session.

Step 93: transmitting the network policy parameter to a subscription management function entity or a policy management function entity, and triggering the network policy update for subscription management function entity or the policy management function entity.

It should be appreciated that, in some cases, the application server may not be necessarily connected to a $3^{rd}$-Generation Partnership Projection (3GPP) network via an interface, e.g., an Rx interface for an LTE network. At this time, the application server may provide the application layer information through the other core network device, e.g., a capability open platform.

To be specific, Step 92 may include: analyzing and extracting the application layer information, and converting the application layer information into the corresponding network policy parameter.

It should be appreciated that, upon the receipt of the relevant information from the application server, the capability open platform may analyze and extract the information, and convert the application layer information into the information capable of being identified by the 3GPP network. For example, the mobility restriction of the UE may be determined in accordance with the mobility information of the UE, and the continuity mode for the PDU session may be determined in accordance with the service continuity requirement.

Figure 10:
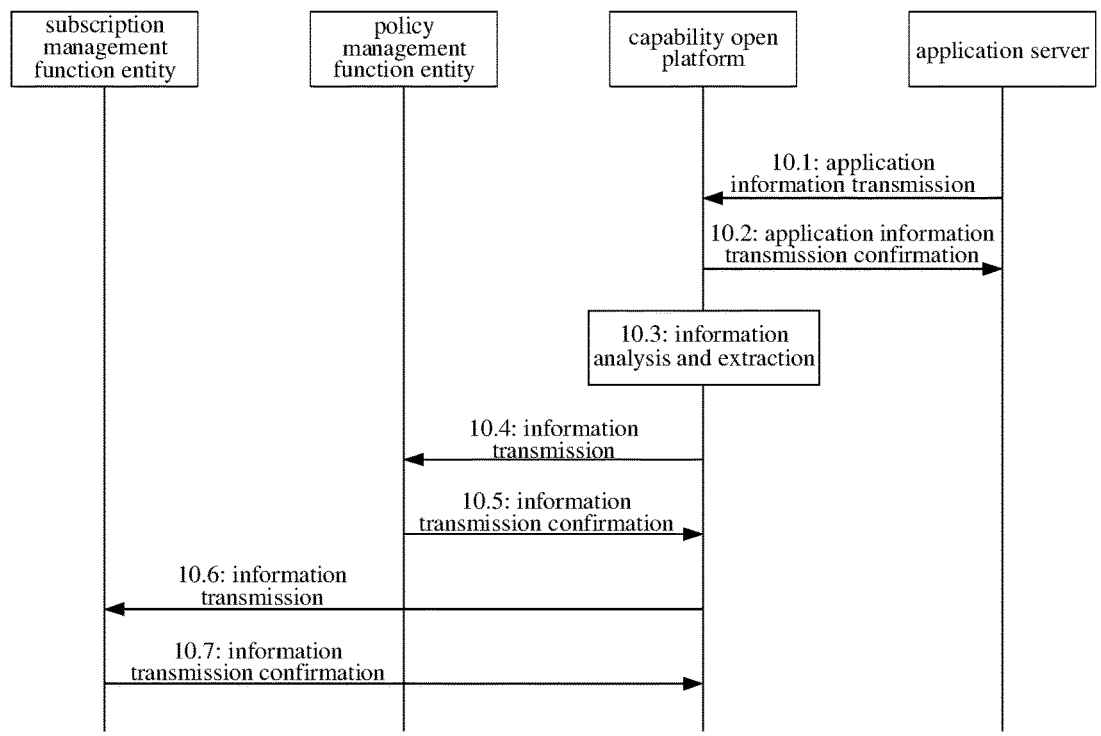
FIG. 10 is another flow chart of the method for triggering network policy update according to some embodiments of the present disclosure.

In some embodiments of the present disclosure, as shown in FIG. 10, a method for triggering network policy update includes the following steps.

Step 10.1: the capability open platform may receive UE-related or application-related information from the application server, e.g., the application layer information including the mobility information of the UE and the service continuity requirement.

Step 10.2: upon the receipt of the application layer information, the capability open platform may transmit a confirmation message to the application server.

Step 10.3: the capability open platform may analyze and extract the received relevant information, and convert the application layer information into the information capable of being identified by the 3GPP network. For example, the mobility restriction of the UE may be determined in accordance with the mobility information of the UE, and the continuity mode for the PDU session may be determined in accordance with the service continuity requirement on the application.

Step 10.4: the capability open platform may transmit the mobility restriction and/or the continuity mode for the PDU session to the policy management function entity, and the policy management function entity that has received the information may trigger the policy update procedure.

Step 10.5: upon the receipt of the information from the capability open platform, the policy management function entity may return an information transmission confirmation message to the capability open platform.

Step 10.6: the capability open platform may transmit the mobility restriction and/or the continuity mode for the PDU session to the subscription management function entity, and the subscription management function entity which has received the information may trigger the network policy update procedure.

Step 10.7: upon the receipt of the information from the capability open platform, the subscription management function entity may return an information transmission confirmation message to the capability open platform.

It should be appreciated that, Step 10.4 and Step 10.6 may not be performed simultaneously, i.e., the capability open platform may select one of the subscription management function entity and the policy management function entity depending on a running state of the network, so as to transmit the information to the one of the subscription management function entity and the policy management function entity.

According to the embodiments of the present disclosure, when there is no direct interface between the application server and the 3GPP network, the application layer information of the application server may be transmitted to the subscription management function entity or the policy management function entity in the network through the capability open platform. In addition, in order to reduce an operating burden of the subscription management function entity and the policy management function entity, the capability open platform may convert the application layer information into the network policy parameter, and then transmit the network policy parameter to the subscription management function entity or the policy management function entity. In this way, it is able to transmit the application layer information to the core network device, and prevent the operation at the network from being adversely affected due to the heavy load of the subscription management function entity and the policy management function entity.

Figure 11:
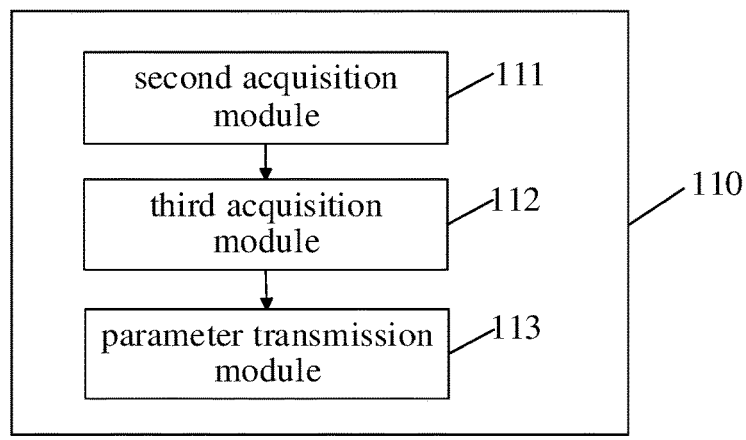
FIG. 11 is a block diagram showing a core network device according to some embodiments of the present disclosure.

The present disclosure further provides in some embodiments a core network device 110 which, as shown in FIG. 11, includes: a second acquisition module 111 configured to acquire application layer information of a UE from an application server; a third acquisition module 112 configured to acquire a network policy parameter corresponding to the application layer information in accordance with the application layer information; and a parameter transmission module 113 configured to transmit the network policy parameter to a subscription management function entity or a policy management function entity, and trigger the network policy update for subscription management function entity or the policy management function entity.

In a possible embodiment of the present disclosure, the application layer information may include mobility information of the UE and/or continuity feature information of a service, the network policy parameter corresponding to the mobility information of the UE may include mobility restriction of the UE, and the network policy parameter corresponding to the continuity feature information of the service may include a continuity mode required by a PDU session.

In a possible embodiment of the present disclosure, the third acquisition module 112 is further configured to analyze and extract the application layer information, and convert the application layer information into the corresponding network policy parameter.

It should be appreciated that, the implementation of the core network device may refer to that of the method in FIG. 9, with a same technical effect.

Figure 12:
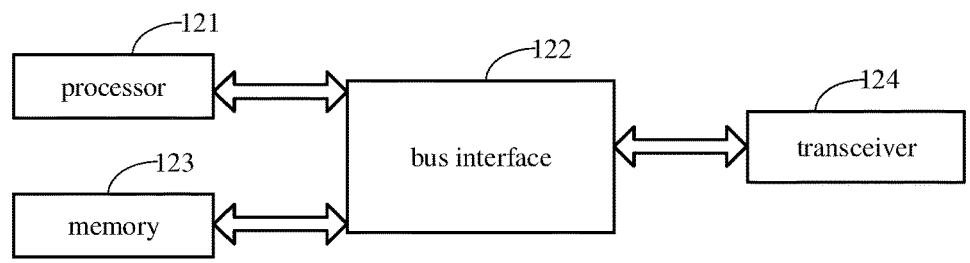
FIG. 12 is a schematic view showing the core network device according to some embodiments of the present disclosure.

The present disclosure further provides in some embodiments a core network device which, as shown in FIG. 12, includes a processor 121, and a memory 123 connected to the processor 121 via a bus interface 122 and configured to store therein programs and data for the operation of the processor 121. The processor 121 is configured to call and execute the programs and data stored in the memory 123, so as to: acquire application layer information of a UE from an application server; acquire a network policy parameter corresponding to the application layer information in accordance with the application layer information; and transmit through a transceiver 124 the network policy parameter to a subscription management function entity or a policy management function entity, and trigger the network policy update for subscription management function entity or the policy management function entity.

It should be appreciated that, the processor 121 is further configured to achieve the function of any other module of the above-mentioned core network device.

It should be further appreciated that, the core network device may be a capability open platform of a network.

It should be further appreciated that, the transceiver 124 may be connected to the bus interface 122 and configured to transmit the network policy parameter under the control of the processor 121.

It should be appreciated that, in FIG. 12, a bus architecture may include a number of buses and bridges connected to each other, so as to connect various circuits for one or more processors such as the processor 121 and one or more memories such as the memory 123. In addition, the bus architecture may be used to connect any other circuits, such as a circuit for a peripheral device, a circuit for a voltage stabilizer and a power management circuit. The bus interface may be provided, and the transceiver 124 may consist of multiple elements, i.e., a transmitter and a receiver for communication with any other devices over a transmission medium. The processor 121 may take charge of managing the bus architecture as well as general processings. The memory 123 may store therein data for the operation of the processor 121.

It should be further appreciated that, all or parts of the steps in the embodiments of the present disclosure may be performed by hardware or a computer program instructing the corresponding hardware. The computer program may include instructions for executing parts of or all the steps in the above methods, and the computer program may be stored in a computer-readable storage medium in any form.

Figure 13:
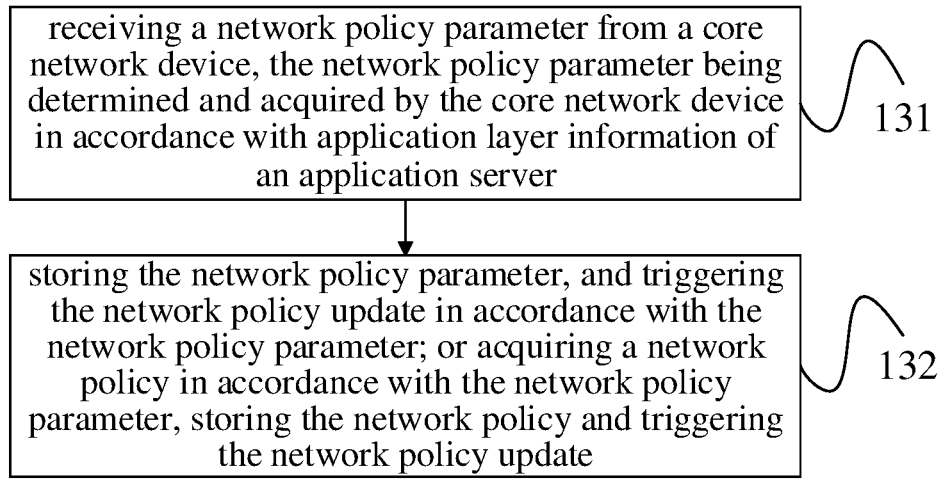
FIG. 13 is a flow chart of a method for triggering network policy update according to some embodiments of the present disclosure.

As shown in FIG. 13, the present disclosure further provides in some embodiments a method for triggering network policy update, wherein the method is configured to be applied to a subscription management function entity, and includes the following steps.

Step 131: receiving a network policy parameter from a core network device, the network policy parameter being determined and acquired by the core network device in accordance with application layer information of an application server.

It should be appreciated that, the application layer information may include mobility information of a UE and/or continuity feature information of a service. The network policy parameter corresponding to the mobility information of the UE may include mobility restriction of the UE, and the network policy parameter corresponding to the continuity feature information of the service may include a continuity mode required by the PDU session.

Step 132: storing the network policy parameter, and triggering the network policy update in accordance with the network policy parameter; or acquiring a network policy in accordance with the network policy parameter, storing the network policy and triggering the network policy update.

According to the embodiments of the present disclosure, the network policy parameter may be received from the core network device, and whether to update the network policy may be determined in accordance with the network policy parameter. When the network policy update is required to be triggered, the update request may be transmitted to the network control function entity. Whether to update the network policy may be determined in accordance with the network policy parameter determined in accordance with the application layer information of the application server. As a result, it is able to ensure the accuracy of the network policy and ensure the reliability of the network communication.

Figure 14:
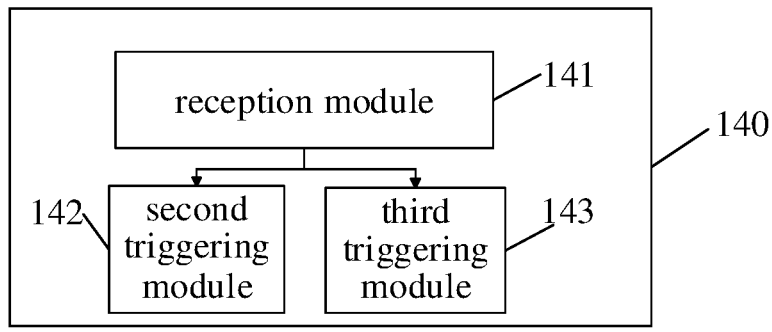
FIG. 14 is a block diagram showing a subscription management function entity according to some embodiments of the present disclosure.

The present disclosure further provides in some embodiments a subscription management function entity 140 which, as shown in FIG. 14, includes: a reception module 141 configured to receive a network policy parameter from a core network device, the network policy parameter being determined and acquired by the core network device in accordance with application layer information of an application server; and a second triggering module 142 configured to store the network policy parameter, and trigger the network policy update in accordance with the network policy parameter; or a third triggering module 143 configured to acquire a network policy in accordance with the network policy parameter, store the network policy and trigger the network policy update.

The application layer information may include mobility information of the UE and/or continuity feature information of a service, the network policy parameter corresponding to the mobility information of the UE may include mobility restriction of the UE, and the network policy parameter corresponding to the continuity feature information of the service may include a continuity mode required by a PDU session.

It should be appreciated that, the implementation of the subscription management function entity may refer to that of the method in FIG. 13, with a same technical effect.

Figure 15:
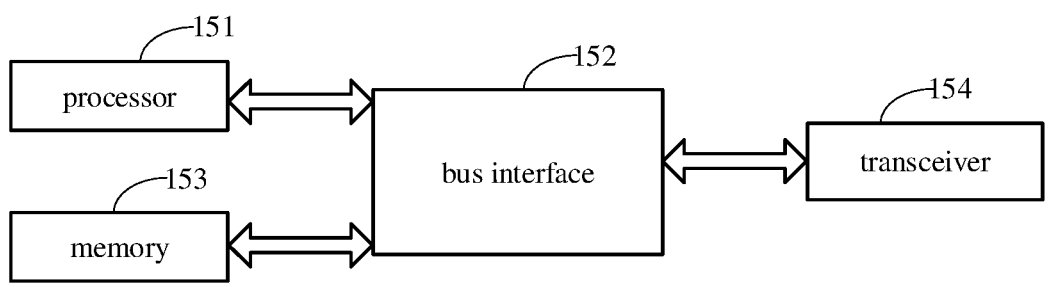
FIG. 15 is a schematic view showing the subscription management function entity according to some embodiments of the present disclosure.

The present disclosure further provides in some embodiments a subscription management function entity which, as shown in FIG. 15, includes a processor 151, and a memory 153 connected to the processor 151 via a bus interface 152 and configured to store therein programs and data for the operation of the processor 151. The processor 151 is configured to call and execute the programs and data stored in the memory 153, so as to: receive through a transceiver 154 a network policy parameter from a core network device, the network policy parameter being determined and acquired by the core network device in accordance with application layer information of an application server; and store the network policy parameter, and trigger the network policy update in accordance with the network policy parameter; or acquire a network policy in accordance with the network policy parameter, store the network policy and trigger the network policy update.

It should be appreciated that, the processor 151 is further configured to achieve the function of any other module of the above-mentioned subscription management function entity.

The transceiver 154 may be connected to the bus interface 152, and configured to receive the network policy parameter from the core network device under the control of the processor 151.

It should be appreciated that, in FIG. 15, bus architecture may include a number of buses and bridges connected to each other, so as to connect various circuits for one or more processors such as the processor 151 and one or more memories such as the memory 153. In addition, the bus architecture may be used to connect any other circuits, such as a circuit for a peripheral device, a circuit for a voltage stabilizer and a power management circuit. The bus interface may be provided, and the transceiver 154 may consist of multiple elements, i.e., a transmitter and a receiver for communication with any other devices over a transmission medium. The processor 151 may take charge of managing the bus architecture as well as general processings. The memory 153 may store therein data for the operation of the processor 151.

It should be further appreciated that, all or parts of the steps in the embodiments of the present disclosure may be performed by hardware or a computer program instructing the corresponding hardware. The computer program may include instructions for executing parts of or all the steps in the above methods, and the computer program may be stored in a computer-readable storage medium in any form.

The above embodiments are for illustrative purposes only, but the present disclosure is not limited thereto. A person skilled in the art may make further modifications and improvements without departing from the spirit of the present disclosure, and these modifications and improvements shall also fall within the scope of the present disclosure.

What is claimed is:

1. A method for triggering network policy update, wherein the method is configured to be applied to a policy management function entity, and comprises:
    acquiring a network policy parameter, the network policy parameter being determined and acquired in accordance with application layer information of a User Equipment (UE), the acquiring the network policy parameter including,
        receiving the application layer information of the UE transmitted from an application server, and
        determining the network policy parameter corresponding to the application layer information in accordance with the application layer information by,
            determining mobility restriction of the UE in accordance with mobility information of the UE, when the application layer information includes the mobility information of the UE, or
            determining a continuity mode required by a Protocol Data Unit (PDU) session in accordance with a continuity feature information of a service, when the application layer information includes the continuity feature information of the service; and
    triggering the network policy update in accordance with the network policy parameter.

2. The method according to claim 1, wherein prior to receiving the application layer information transmitted from the application server, the method further comprises:
    transmitting subscription information to the application server, the subscription information indicating acquisition of designated application layer information from the application server.

3. The method according to claim 1, wherein the triggering the network policy update comprises:
    transmitting a network policy update request to a network control function entity.

4. The method according to claim 1, wherein the triggering the network policy update in accordance with the network policy parameter comprises:
    acquiring a network policy in accordance with the network policy parameter, and triggering the network policy update in accordance with the network policy; or
    acquiring the network policy in accordance with the network policy parameter, storing the network policy, and triggering the network policy update.

5. A policy management function entity, comprising a processor, a memory and a transceiver, wherein
    the processor is configured to read a program stored in the memory to:
        acquire a network policy parameter, the network policy parameter being determined and acquired in accordance with application layer information of a UE, the processor configured to acquire the network policy parameter by reading the program stored in the memory to:
            receive, through the transceiver, the application layer information of the UE transmitted from an application server, and
            determine the network policy parameter corresponding to the application layer information in accordance with the application layer information by,
                determining mobility restriction of the UE in accordance with mobility information of the UE, when the application layer information includes the mobility information of the UE, and
                determining a continuity mode required by a PDU session in accordance with a continuity feature information of a service,
            when the application layer information includes the continuity feature information of the service; and
        trigger the network policy update in accordance with the network policy parameter,
    the transceiver is configured to receive and transmit data, and
    the processor takes charge of managing a bus architecture as well as general processings, and the memory is configured to store therein data for an operation of the processor.

6. The policy management function entity according to claim 5, wherein the processor is further configured to read the program stored in the memory to:
    transmit, through the transceiver, subscription information to the application server, the subscription information indicating acquisition of designated application layer information from the application server.

7. The policy management function entity according to claim 5, wherein the processor is further configured to read the program stored in the memory to:
    transmit, through the transceiver, a network policy update request to a network control function entity.

8. The policy management function entity according to claim 5, wherein the processor is further configured to read the program stored in the memory to:
    acquire a network policy in accordance with the network policy parameter, and trigger the network policy update in accordance with the network policy; or
    acquire the network policy in accordance with the network policy parameter, store the network policy, and trigger the network policy update.

9. A method for triggering network policy update, wherein the method is configured to be applied to a core network device, and comprises:
    acquiring application layer information of a UE from an application server, the application layer information including mobility information of the UE and/or continuity feature information of a service;

acquiring a network policy parameter corresponding to the application layer information in accordance with the application layer information, the network policy parameter corresponding to the mobility information of the UE being a mobility restriction of the UE, and the network policy parameter corresponding to the continuity feature information of the service being a continuity mode required by a PDU session; and transmitting the network policy parameter to a subscription management function entity or a policy management function entity, and triggering the subscription management function entity or the policy management function entity to perform the network policy update.

10. The method according to claim 9, wherein the acquiring the network policy parameter corresponding to the application layer information in accordance with the application layer information comprises:

analyzing and extracting the application layer information, and converting the application layer information into the corresponding network policy parameter.

11. A core network device for implementing the method according to claim 9, comprising a processor, a memory and a transceiver, wherein the processor is configured to read a program stored in the memory to:
- acquire, through the transceiver, application layer information of a UE from an application server;
- acquire a network policy parameter corresponding to the application layer information in accordance with the application layer information; and
- transmit, through the transceiver, the network policy parameter to a subscription management function entity or a policy management function entity, and trigger the subscription management function entity or the policy management function entity to perform the network policy update, the transceiver is configured to receive and transmit data, and the processor takes charge of managing a bus architecture as well as general processings, and the memory is configured to store therein data for an operation of the processor.

* * * * *